United States Patent
Ribbeck et al.

(10) Patent No.: US 10,209,051 B2
(45) Date of Patent: Feb. 19, 2019

(54) CONTACT MEASUREMENT ON THE TOOTH FLANK OF A GEARWHEEL WORKPIECE

(71) Applicant: Klingelnberg AG, Zürich (CH)

(72) Inventors: Karl-Martin Ribbeck, Remscheid (DE); Rafael Frischtatzky, Bergisch-Gladbach (DE); Rolf Schalaster, Wermelskirchen (DE)

(73) Assignee: KLINGELNBERG AG (CH)

( * ) Notice: Subject to any disclaimer, the term of this patent is extended or adjusted under 35 U.S.C. 154(b) by 127 days.

(21) Appl. No.: 15/617,076

(22) Filed: Jun. 8, 2017

(65) Prior Publication Data

US 2017/0356732 A1 Dec. 14, 2017

(30) Foreign Application Priority Data

Jun. 9, 2016 (EP) .................................... 16173728

(51) Int. Cl.
*G01B 5/20* (2006.01)
*G01B 7/14* (2006.01)

(52) U.S. Cl.
CPC ............. *G01B 5/202* (2013.01); *G01B 7/146* (2013.01); *G01M 13/021* (2013.01)

(58) Field of Classification Search
CPC .................................................... G01B 5/202
USPC ...................................................... 33/501.14
See application file for complete search history.

(56) References Cited

U.S. PATENT DOCUMENTS

| | | | | |
|---|---|---|---|---|
| 4,610,091 A | * | 9/1986 | Bertz | G01B 7/283 33/501.15 |
| 4,646,443 A | * | 3/1987 | Hofler | G01B 7/283 33/501.15 |
| 4,769,917 A | * | 9/1988 | Bertz | G01B 5/202 33/501.18 |

(Continued)

FOREIGN PATENT DOCUMENTS

| | | |
|---|---|---|
| DE | 10044879 A1 | 4/2002 |
| JP | H0989533 A | 4/1997 |

(Continued)

OTHER PUBLICATIONS

Goch et al., "Gear Metrology," CIRP Annals, vol. 52, Issue 2, Jan. 1, 2003, pp. 659-695.

(Continued)

*Primary Examiner* — George B Bennett
(74) *Attorney, Agent, or Firm* — McCarter & English, LLP

(57) ABSTRACT

A method and apparatus for carrying out contact measurement on at least one tooth flank of a gearwheel workpiece including the steps of:
predetermining or defining a maximum region relating to the tooth flank,
predetermining or defining a critical region relating to the tooth flank that overlaps the maximum region at least in part,
executing relative movements of a probe of a measuring apparatus to guide the probe along the tooth flank to
obtain actual measured values with a first resolution for a plurality of locations on the tooth flank within the maximum region, and
obtain actual measured values with a second resolution for a plurality of locations on the tooth flank within (Continued)

the critical region, wherein the second resolution is higher than the first resolution.

24 Claims, 4 Drawing Sheets

(56) References Cited

U.S. PATENT DOCUMENTS

| | | | | |
|---|---|---|---|---|
| 4,962,590 | A | * | 10/1990 | Ambrose ............... G01B 5/202 33/501.14 |
| 2009/0028655 | A1 | * | 1/2009 | Ribbeck ............... B23F 17/003 409/27 |
| 2010/0083516 | A1 | * | 4/2010 | Mashue ............. G01M 13/021 33/501.7 |
| 2014/0347043 | A1 | | 11/2014 | Chana |
| 2015/0285610 | A1 | * | 10/2015 | Knabel .................... G01B 5/20 33/501.14 |
| 2016/0116268 | A1 | | 4/2016 | Grant, Jr. et al. |
| 2016/0116269 | A1 | * | 4/2016 | Grant, Jr. ............... G01B 5/008 33/503 |
| 2018/0056416 | A1 | * | 3/2018 | Ribbeck .................. B23F 19/00 |

FOREIGN PATENT DOCUMENTS

| | | |
|---|---|---|
| JP | H09178461 A | 7/1997 |
| JP | 2007271493 A | 10/2007 |
| JP | 2011133237 A | 7/2011 |

OTHER PUBLICATIONS

Extended European Search Report dated Sep. 23, 2016 for European Patent Application EP16173728, 2 pages.

* cited by examiner

CONTACT MEASUREMENT ON THE TOOTH FLANK OF A GEARWHEEL WORKPIECE

This application claims priority under 35 U.S.C. §§ 119 (a)-(d) to European patent application no. EP16173728.3 filed Jun. 9, 2016, which is hereby expressly incorporated by reference as part of the present disclosure as if fully set forth herein.

FIELD OF INVENTION

The invention relates to carrying out a contact measurement on at least one tooth flank of a gearwheel workpiece and a measuring apparatus which is fitted accordingly.

BACKGROUND

The topography and the surface properties of a gearwheel workpiece are important quality features in the field of toothed gearing.

There are therefore different measuring apparatuses for detecting the topography and the surface properties of gearwheel workpieces. Methods operating in a contactless manner and those operating in a probing or contacting manner are distinguished.

A probe is typically guided over the surface during mechanical probing. The result is a height signal recorded over the length of the probing path, which is also known as the surface profile. In the case of spur gears, only a line along the profile line and the flank line is typically measured. In the case of bevel gears, a virtual grid is placed on the radial projection of a tooth flank in order to thus define the target measuring points on the basis of such grid. Relatively coarsely meshed grids are adequate in order to check the topography of the tooth flanks of bevel gears.

Most probing or contact measuring methods are serially-operating methods, which leads to an increased expenditure of time and computing power in the event of an increase in the measuring precision. For example, for a gearwheel with 10 teeth, there are 20 tooth flanks which need to be measured. If a 5×9 grid of measurement points are provided per tooth flank, 900 total actual measured values are generated within the framework of such a measurement system. During computational evaluation and conditioning of said actual measured values, the 900 values are correlated, for example, with respective target data. This simple numerical example shows the computational complexity with which the user is confronted.

As the demands placed on toothed gearings are constantly on the rise, examinations are frequently also necessary which permit statements on the microstructure of the tooth flanks. Such statements are only possible if the resolution of the measurements is increased.

SUMMARY

It is an object of some of the embodiments of the invention to provide a measurement approach which allows measuring surface properties of tooth flanks in a rapid, precise and reproducible manner.

It is an aspect of some embodiments of the invention that measurements are carried out in such a way that actual measured values of the topography, for example, can be correlated in a simple computational manner with the actual measured values of the surface. In order to enable this, the measurement of the surface property or properties can be made in a geometrically-known context with the measurement of the topography.

The measurement can be made in one or more embodiments within a critical region with a coordinate system (e.g., in form of a second measurement grid) which is in a known geometric correlation with a coordinate system (e.g., in form of a first measurement grid) of a maximum region.

The second measurement grid may be in a known geometric correlation with the first measurement grid. Said geometric correlation can be obtained, for example, from the fact that the first measurement grid and the second measurement grid at least partly overlap each other. The first measurement grid and the second measurement grid can also cover the same region of a flank, e.g., the two measurement grids can also be congruent, wherein they may differ from each other however by a different mesh or grid density. The first measurement grid and the second measurement grid may also be brought to a known geometric correlation in such a way that the two measurement grids jointly have at least one common measurement point (e.g., a common grid point of the measurement grids).

The term "measurement grid" shall be broadly interpreted in the present context. It can concern a measurement grid with uniform mesh density, for example, or, as another non-limiting example, it can concern a measurement grid whose mesh or grid density is variable.

The second measurement grid may be, for example, a measurement grid with a higher uniform or variable mesh density than the uniform or variable mesh density of the first measurement grid.

An application-specific toothed gearing measurement may be utilized. For this purpose, actual measured data or actual measurement grids are determined, according to one or more embodiments of the invention, depending on the toothed gearing to be measured.

Some of the embodiments of the invention allow defining regions as critical regions which are relevant in an application-specific manner (e.g., under load or load-free).

The position and/or dimension of a critical region may be determined automatically in one or more embodiments (e.g., by computer support) in order to allow carrying out measurements with higher precision in this critical region.

In accordance with some of the embodiments of invention, the precision of the measurement can be increased locally and the measurement time is reduced significantly in comparison with a high-resolution measurement of the entire tooth flank.

A method according to some of the embodiments of the invention is conducted in such a way that a tooth flank with a coarser first measurement grid and a critical partial region of the tooth flank with a finer second measurement grid can be determined in a combined manner in one measurement operation. These two measurement grids may be correlated with each other in a known manner (e.g., computationally/geometrically), e.g., in that the two measurement grids overlap at least partly or in that the two measurement grids have at least one measurement point in common.

The use of a measurement probe in accordance with some of the embodiments of the invention may be used to measure the surface property of the tooth flanks of gearwheels, wherein the longitudinal axis of the measurement probe is guided in such a way that it is guided in a flat manner over the tooth flank in order to determine actual measured values within the scope of a first coarser grid and within the scope of a second finer grid.

In some embodiments of the invention, the waviness of tooth flanks, for example, can be determined rapidly and reliably.

In some embodiments of the invention, conclusions or predictions on the expected noise behavior of gearwheels, for example, can be made rapidly.

Some embodiments may be used, for example, for examining crack formation, grain formation and other wearing phenomena on tooth flanks of gearwheels.

The aforementioned first and second measurement grids, or the measurement grid with a locally increased measurement density, may be defined on the basis of a sectional illustration and/or on the basis of a projection of the respective flank, or they can be defined on the real flank, as just some examples.

The first and/or the second measurement grid may have a regular shape that can be defined in a sectional illustration and/or in a projection of the flank and/or on the real flank.

Some of the embodiments of the invention can be used in connection with 1D, 2D and 3D measuring apparatuses.

DRAWINGS

Exemplary embodiments of the invention will be described below in closer detail by reference to the drawings, wherein.

Figure 3A:
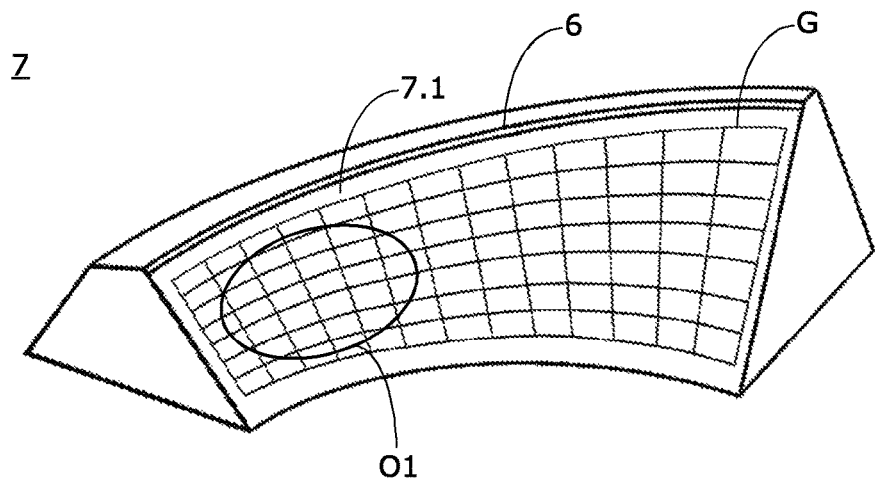
FIG. 3A shows a schematic perspective view of a single tooth of a bevel gear, wherein an exemplary (measurement) grid is shown on the concave flank.
Figure 3B:
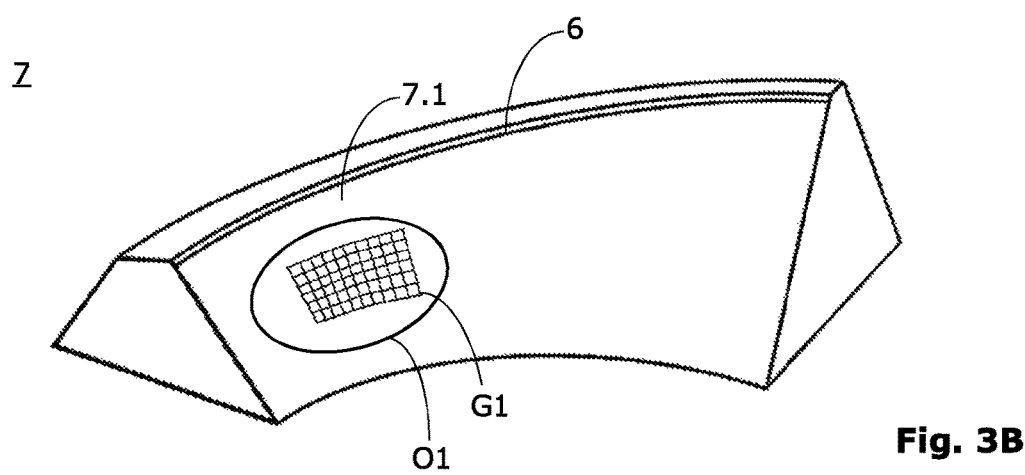
FIG. 3B shows a schematic perspective view of the tooth of FIG. 3A, wherein a finer (measurement) grid is shown on the concave flank as an example.
Figure 3C:
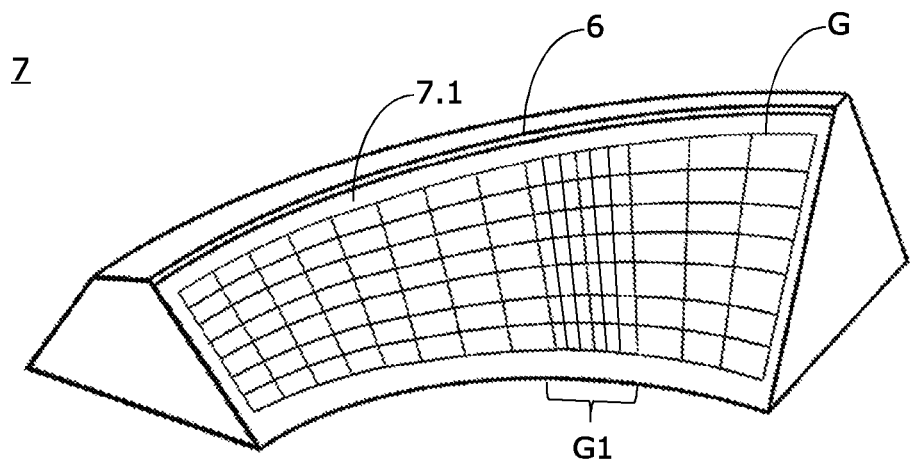
Figure 4:
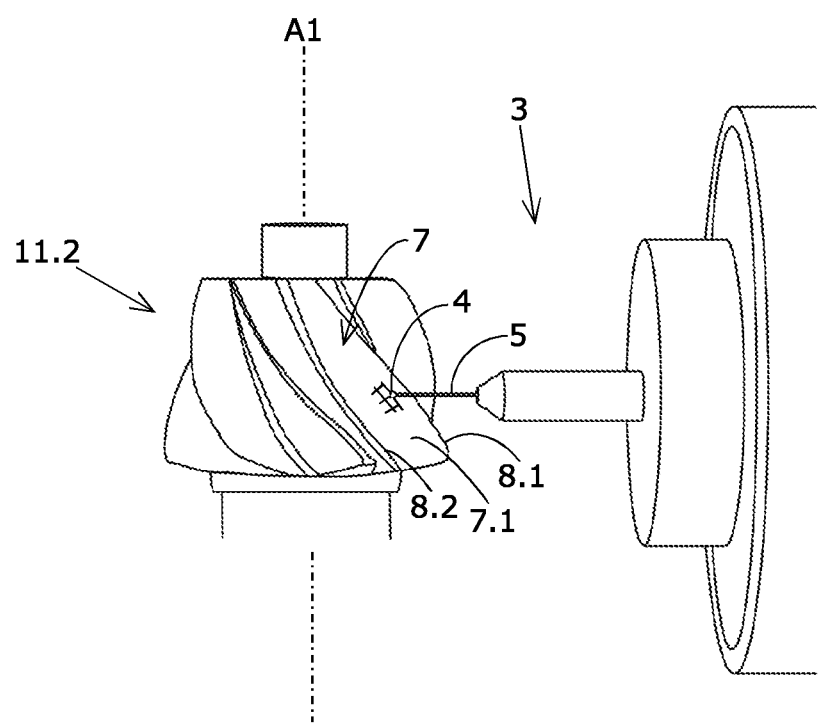

FIG. 3C shows a schematic perspective view of a single tooth of a bevel gear, wherein an exemplary (measurement) grid is shown on the concave flank, which comprises a first region with a coarser grid structure (resolution) and a second region with a finer grid structure (resolution), wherein the first region converges into the second region and the second region into the first; and FIG. 4 shows the schematic configuration of an exemplary probe during the probing of the tooth flank of a pinion in accordance with an embodiment of the invention.

DETAILED DESCRIPTION OF EMBODIMENTS

Terms are used in conjunction with the present description which are also used in relevant publications and patents. However, it is to be noted that the use of these terms is only to serve for better comprehension. The inventive concepts are not to be limited by the specific selection of the terms. At least some embodiments of the invention may be readily transferred to other term systems and/or technical fields. The terms are to be applied accordingly in other technical fields.

Among other things, embodiments of the invention relate to the topography (e.g., the crowning) and the surface properties (e.g., waviness) of tooth flanks 7.1 shown in the Figures. The term "topography" is rather limited to the macroscopic, within the terms of structural statements. The term "surface property" is rather limited to the microscopic, within the terms of point-like or local statements. In the context of the surface properties, embodiments of the invention relate to structures, elements and features of a tooth flank 7.1 which have a magnitude from nanometer scale to approx. 500 μm (microns).

Figure 2A:
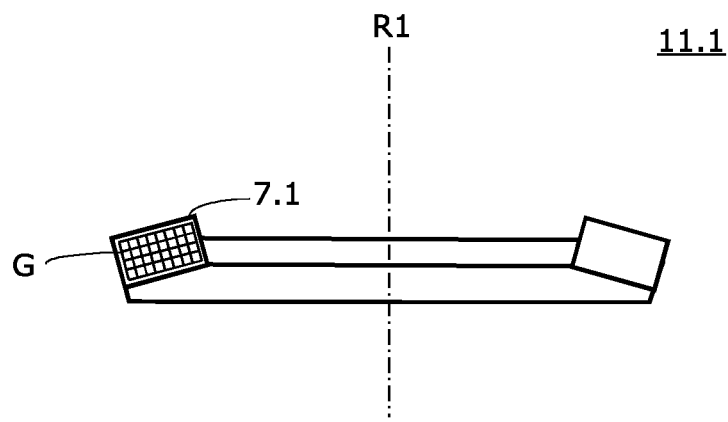
FIG. 2A shows a schematic view of a ring gear in a radial sectional view, wherein a uniform (measurement) grid is shown in the region of a tooth flank.

Gearwheel workpieces are generally designated in the Figures with the reference numeral 11. If reference is made to a particular gearwheel workpiece, said particular gearwheel workpiece is provided with an index. FIG. 2A shows a ring gear 11.1 as an exemplary a special gearwheel workpiece, for example. FIG. 4 shows a pinion 11.2 as a special gearwheel workpiece, for another example.

In some embodiments, a measuring probe 3 is guided continuously in contact mode over the surface to be measured. Alternatively, a switching probe 3 is brought into contact with the surface in a point-like manner. Such a probe can optionally be predetermined or provided with an oscillation in order to thus improve the measurement sensitivity.

Some embodiments relate to a contact-based method, which is also known as a probing method. Such measurement may be considered as contact measurement. The contact of the probe with the surface can be point-like (e.g., on the grid points of a uniform and non-uniform grid), or it can extend along a straight line (e.g., along a line of a grid), along a curve, along a polygonal progression, or any other desired progression.

Figure 1:
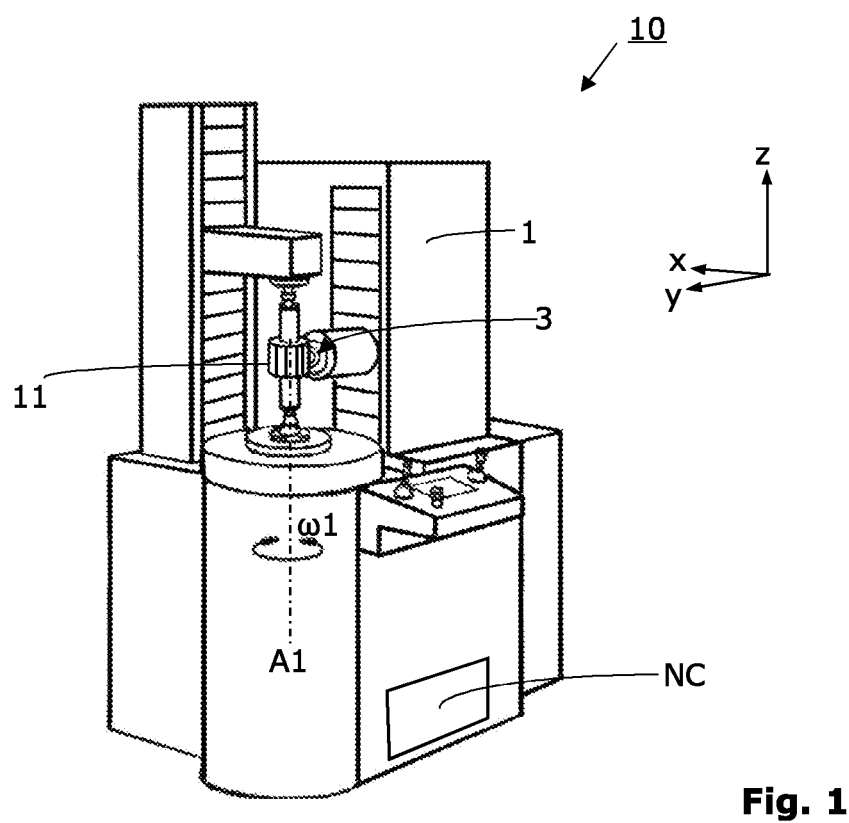
FIG. 1 shows a perspective view of an apparatus (here in form of a CNC measuring device), which is designed for carrying out an embodiment of the invention.
Figure 2B:
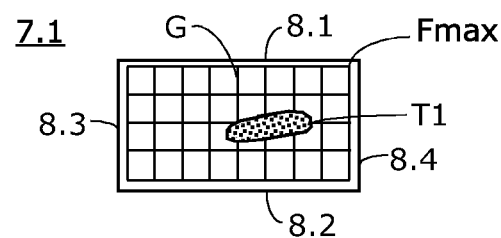
FIG. 2B shows an enlarged view of the tooth flank of FIG. 2A, wherein an exemplary tooth contact pattern is shown in addition to the uniform (measurement) grid.

A measuring apparatus 10, as shown by way of example in FIG. 1, provides contact measurement of the topography and the surface properties of tooth flanks 7.1 of gearwheel workpiece 11.1, an exemplary embodiment shown in FIG. 2A, in a reliable, reproducible and highly precise manner. Further details with respect to such a measurement are also described in connection with FIG. 4. Within the scope of such a contact measurement the following steps M1 to M4 can be carried out for example:

M1. Predetermination of a maximum region Fmax relating to the tooth flank 7.1, as shown by way of example in FIG. 2B. In accordance with some embodiments of the invention, the maximum region Fmax can be predetermined in different ways. The predetermination of the maximum region Fmax may be performed in a processor-supported manner (computer). Respective examples are mentioned below.

a) In the design of the toothing of the gearwheel workpiece 11, target measurement data of the tooth flanks 7.1 of the gearwheel workpiece 11 are typically defined and stored for later use. Said target measurement data can already be defined in the design in a maximum region Fmax of the tooth flanks 7.1. In this case, the respective parameters are loaded in step M1 from a memory.

b) The maximum region Fmax can be defined either during design or before carrying out a contact measurement. This can occur, for example, by manual input of indentations or edges by using a (graphic) user interface. It can be recognized by reference to the example in FIG. 2B that the maximum region Fmax can be defined as a rectangle, for example. Narrow border strips can be recognized at the edge of the tooth flank 7.1 of FIG. 2B which do not lie in the region of a measurement grid G. In FIG. 2B, the tooth flank 7.1 is bounded at the top by the tooth head 8.1, at the bottom by the tooth root 8.2, to the left by the outer tooth end 8.3, and to the right by the inner tooth end 8.4. The narrow border strips, or the indentations, respectively, can be defined in millimeters or percentage rates, for example.

c) In general, the maximum region Fmax can also be defined as a polygonal progression by predetermining relative or absolute quantities.

M2. Predetermination of a critical region Fk relating to the tooth flank 7.1, wherein the critical region Fk lies completely within the maximum region Fmax, as is shown by way of example in FIG. 2C, or wherein the critical region Fk overlaps the maximum region Fmax at least in part or in full. As is already indicated by using the word "critical," a certain, e.g., selected, region is of particular interest in carrying out the contact measurement. The term "critical" shall not be understood in a narrow sense, however. The critical region Fk concerns a region which is of particular interest. FIGS. 2A and 2B show the tooth contact pattern T1 of the tooth flank 7.1, by way of example. In order to enable a more detailed examination of the component in the region of said tooth contact pattern Ti, the critical region Fk may be defined and positioned in such a way, for example, that it includes the tooth contact pattern T1. In accordance with some embodiments of the invention, the critical region Fk can be predetermined in different ways. The predetermination of the critical region Fk can occur in a processor-supported (computer) manner. Respective examples are mentioned below.

a) In the design of the toothing of the gearwheel workpiece 11, the critical region Fk can be stored for later use.

b) A simulation can be used in order to predetermine the position of the tooth contact pattern T1 of the tooth flank 7.1, for example. The critical region Fk can be defined on the basis of this simulation.

c) It is also possible, in some embodiments, to measure the running behavior of the gearwheel workpiece 11, with another gearwheel, for example, in order to thus determine a region which needs closer examination. In this example, the critical region Fk may then be defined in such a way that it includes the region which needs to be examined more precisely.

d) The critical region Fk can also be defined after an imaging examination of the tooth flank 7.1.

M3. Effecting first relative movements with a switching or measuring probe 3 of a measuring apparatus 10 in order to guide a probe tip, skid or ball 4 of the probe 3 along the tooth flank 7.1 in such a way that actual measuring values with a first resolution are provided for several locations of the tooth flank 7.1 within the maximum region Fmax. In the case of the examples shown in FIGS. 2A to 2C, the performance of the first contact measurement occurs on the basis of a regular measurement grid G, which predetermines ze=5 lines and s=9 columns for the maximum region Fmax. Measured values are respectively detected in this example at the intersection points (grid points) of the lines and columns. The first resolution in this example is 5×9 measured values relating to the surface Fmax.

The performance of the first relative movement can be executed in a continuous manner such that a measuring probe 3 is guided line by line in the maximum region Fmax over the tooth flank 7.1. This movement can optionally be superimposed with an oscillation of the probe 3. The actual measured values can be detected in such a way, for example, that in equidistant distances the respectively current measured values are written into a memory. Alternatively, the measured values can be detected and stored in equal time units (cycled) during a uniform movement of the probe 3.

The performance of the first relative movement can also be executed discretely, at least in part, however, in that the probe 3 is guided to each individual grid point of the grid G in order to perform a local measurement at that location. The performance of discrete measurements may be used, for example, with switching probes.

Figure 2C:
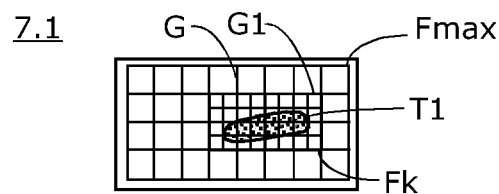
FIG. 2C shows the view of FIG. 2B, wherein a critical region is provide a finer uniform (measurement) grid in addition to the above-mentioned (measurement) grid and tooth contact pattern.

M4. Effecting second relative movements with a probe tip, skid or ball 4 of a probe 3 of the measuring apparatus 10 (the same probe 3 as in step M3 can be used, but a second probe can also or alternatively be used) in order to guide the probe 3 along the tooth flanks 7.1 in such a way that actual measured values are provided with a second resolution for several locations of the tooth flanks 7.1 within the critical region Fk. The second resolution is higher than the first resolution in the embodiment shown. The performance of the contact measurement in the critical region Fk can be executed in a continuous and/or discrete manner, as already described above. In the examples shown in FIGS. 2A to 2C, the performance of the contact measurement in the critical region Fk is executed on the basis of a regular measurement grid G1 with narrower meshes, which predetermines ze=5 lines and s=9 columns for the critical region Fk. Measured values are respectively carried out in this example at the intersection points of the lines and columns. The second resolution is 5×9 measured values in this example relating to the surface Fk (the second resolution can also have different values than the first resolution, for example). The second resolution is greater because the surface Fk is smaller than the surface Fmax. The measurement Grid G1, which is used in measuring the critical region Fk, can spatially coincide with the measurement grid G, as shown in FIG. 2C, wherein at least one line ze of the measurement grid G, for example coincides with one line ze of the measurement grid G1. Alternatively or in addition, at least one line s of the measurement grid G1 coincides with one line s of the measurement grid G1. In such embodiments, all actual measured values lie in the same reference coordinate system. If a measurement grid G1 is used in step M4 which does not coincide with the measurement grid G, computational adjustments (e.g., by means of coordinate transformation that would be understood by those of ordinary skill in the art) are carried out in order to correlate the actual measured values to each other.

In at least some embodiments, the measurement can be carried out such that the first relative movement converges into the second relative movement and then back into the first, as will be described further below by reference to FIG. 3C.

In at least some embodiments, the measurement can be carried out such that the critical region Fk is probed both within the scope of step M3 and also within the scope of step M4.

In at least some embodiments, relative movements with the probe 3 of the measuring apparatus 10 are carried out in such a way that the probe 3 is guided along the tooth flank 7.1, wherein during these relative movements actual measured values with a first resolution are provided for several locations of the tooth flanks 7.1 within the maximal region Fmax, and actual measured values with a second resolution are provided for several locations of the tooth flanks 7.1 within the critical region Fk, wherein the second resolution is higher than the first resolution.

In at least some embodiments, probing with the first resolution is limited to the maximum region Fmax outside of the critical region Fk.

In some embodiments, step M4 is carried out before the step M3.

In some embodiments, steps M3 and M4 are at least partly carried out simultaneously. For example, if the second line (originating from the tooth head 8.1) of the grid G of FIG. 2C is probed at constant velocity from the left to the right, the resolution in the region Fk can be increased by adjusting the read-out clock rate from the probe. In the illustrated embodiment, the read-out clock rate may be doubled to obtain actual measured values at the intermediate grid points of the grid G1 in addition to at the grid points of the grid G. In the example of FIG. 2C, probing occurs again with the resolution of the grid G in the complete lowermost line.

The critical region Fk can also correspond, if desired, to the tooth contact region of the tooth flank 7.1. For example, it can include a tooth contact region of the tooth flanks 7.1, or it can be derived from data (e.g., determined by simulation) concerning a tooth contact region of the tooth flank 7.1.

The position of the tooth flank 7.1 may also be derived from design data, for example, which were determined during the design of the gearwheel workpiece 11.

The position of the tooth contact region on the tooth flank 7.1 can be derived from a data record for example, wherein displacement adjustments of the position of the tooth contact region are carried out under load of the gearwheel workpiece 11 in order to determine the critical region Fk on the basis of respectively adjusted data.

The position of the critical region Fk on the tooth flank 7.1 can also be determined, for example, by considering excitation behavior during pairing of the gearwheel workpiece 11 with another gearwheel workpiece. The excitation behavior can be examined by means of simulation and/or measurement in order to thereafter determine one or several regions of the tooth flank 7.1 which is/are to be examined in closer detail. The critical region Fk can then be defined in such a way that it includes the region or regions.

The critical region Fk may also be defined on the basis of a computational contact analysis.

The critical region Fk may also be defined in some or all embodiments on the basis of the progression of a line of contact.

FIG. 3A shows a schematic perspective view of an individual tooth 7 of a gearwheel workpiece 11 with helical toothing, wherein said tooth 7, which is shown by way of example, is provided with a head chamfer 6 on the concave flank 7.1. The dimensions of the head chamfer 6 are approximately shown in real size. The tooth 7 tapers from the heel (on the right side in the image) to the toe (on the left side in the image). The tooth height at the heel is greater than the tooth height at the toe.

An exemplary first measurement grid G is shown on the flank 7.1, which consists in this case of ze=8 rows and s=14 columns, wherein odd numbers are more conventional in the measurement of gearwheels. It is shown in FIG. 3A that said measurement grid G was placed on the flank 7.1 in such a way that there is a clearance all around. Other than in the case of FIGS. 2A to 2C where uniform measurement grids G and G1 were defined in the radial projection, the measurement grid G of FIG. 3A was defined on the real target flank as a uniform measurement grid G.

In the embodiment illustrated in FIG. 3A, the maximum region is the region of the tooth flank that is defined by the first measurement grid G. In this embodiment, the maximum region only covers part of the surface of the tooth flank 7.1. The remainder of this surface of the tooth flank 7.1 defines as a peripheral region (the part of the tooth flank 7.1 surrounding/enclosing the grid G). Further, one or more peripheral distances are defined between the boundaries or edges of the tooth flank and the maximum region. Accordingly, the peripheral region and/or peripheral distance(s) indirectly define or determine the maximum region. For example, if the tooth flank has a rectangular size of 10 mm by 10 mm and the peripheral distance is 2 mm, then the size of the maximum region is 8 mm by 8 mm.

In FIG. 3A, a critical region Fk is identified by an oval O1. In this critical region Fk, the flank 7.1 has a local irregularity of the surface. This irregularity shall be examined specifically within the scope of measuring the flank 7.1. That is why the second measurement grid G1 is determined in such a way that it allows information on the surface property in the critical region Fk. The second measurement grid G1 is shown by reference to an example in FIG. 3B. The grid G1 consists of z=7 rows and s=11 columns in this case. The second measurement grid G1 lies within the critical region Fk, which is also identified in FIG. 3B by the oval O1.

The aforementioned measurement grids G and/or G1 may be defined on the basis of a projection of the concerned flank, or they can be defined on the real target flank.

The measurement grids G and/or G1 may have a regular shape defined in a sectional view and/or in a projection of the flank 7.1 and/or on the real target flank.

The measurement grids G and/or G1 may also have an irregular shape with variable mesh density.

The second measurement grid G1 may also be defined as a section of the first measurement grid G1, in that, locally, the mesh density is increased, as shown in FIG. 3C by way of an example. Either the column width and/or the line width may be reduced within the local increase in the mesh density (the column width was reduced in the embodiment of FIG. 3C). In embodiments with reduced column and/or line width, a geometrically precise correlation is that automatically provided between the first grid G and the second grid G1.

In accordance with some embodiments of the invention, the probe 3, which comprises a probe ball 4 in the embodiment of FIG. 4, is moved over the surface to be scanned (flank 7.1 in this example). FIG. 4 shows a bevel-gear pinion as a gearwheel workpiece 11.2, wherein said gearwheel workpiece 11.2 is vertically clamped (as shown in FIG. 1).

The probe ball 4 can be pulled or pushed during measurement over the tooth flank 7.1 to be scanned. If the probe ball 4 is drawn starting from the tooth root 8.2 in the direction of the tooth head 8.1 of the tooth 7, for example, the probe 3 is drawn, for example, by the superimposed performance of two linear movements, while the gearwheel workpiece 11 is rotated in a counterclockwise manner, so that the probe ball 4 is always aligned at a constant angle (e.g., circumferentially) in relation to the tooth flank 7.1 during measurement. Exemplary rotation of the gearwheel workpiece 11 is indicated in FIG. 1 by the arrow col. The rotational axis of the gearwheel workpiece 11 (known as workpiece rotational axis) is designated in FIG. 1 and FIG. 4 with A1.

The probe ball 4 sits in the illustrated example at the front end of a slender probe arm 5, which can movably sit on a turret 1 of the measuring apparatus 10, as indicated in FIG. 1.

In at least some embodiments, the measuring apparatus 10 which is fitted with at least one probe 3. The measuring apparatus 10 can include numerically controllable axes in order to enable the movement of the probe 3 relative to the tooth flank 7.1 of a gearwheel workpiece 11. A controller NC in the embodiment of FIG. 1 moves and controls the numerically controllable axes. In some embodiments, the controller NC implements the measurements. The measurement execution, in at least some embodiments, is programmed in form of a set of rules which can be loaded and executed by the controller NC.

During the measurement along a column s of a grid G or G1, the required relative movement may be produced, for example, by numerically controlled rotation col of the gearwheel workpiece 11 and numerically controlled linear displacement of the probe 3 parallel to the Y- and Z-axis, for example. During the measurement along a row ze of a grid G or G1, the required relative movement can be produced again by a numerically controlled linear displacement of the probe 3 in combination with a numerically controlled rotation col of the gearwheel workpiece 11. In the case of tooth flanks 7.1 that are shaped in a complex manner, as shown in FIG. 4, superimposed movements of several axes of the measuring apparatus 10 may be implemented. FIG. 4 shows a small section of a measurement grid on the tooth flank 7.1.

As may be recognized by those of ordinary skill in the pertinent art based on the teachings herein, numerous changes and modifications may be made to the above described and other embodiments of the present invention without departing from the spirit of the invention as defined in the claims. Accordingly, this detailed description of embodiments is to be taken in an illustrative, as opposed to a limiting sense.

What is claimed is:

1. A method for contact measurement of at least one tooth flank of a gearwheel workpiece using a probe of a measuring apparatus including a probe tip, probe skid or probe ball, comprising the following steps:
    defining a maximum region relating to a tooth flank of a gearwheel workpiece,
    defining a critical region relating to the tooth flank, wherein the critical region at least partly overlaps the maximum region,
    executing relative movements of the probe to guide the probe along the tooth flank and
        obtaining actual measured values of the tooth flank with a first resolution at a plurality of locations within the maximum region, and
        obtaining actual measured values of the tooth flank with a second resolution at a plurality of locations within the critical region, wherein the second resolution is higher than the first resolution.

2. A method according to claim 1, wherein the obtaining steps are performed using one or more of continuous or punctiform contact of the probe to the tooth flank.

3. A method according to claim 1, wherein the obtaining steps are performed during contact of the probe with the tooth flank.

4. A method according to claim 1, wherein the executing step includes performing first relative movements of the probe and second relative movements of the probe, and the step of obtaining actual measured values within the maximum region is performed during said first relative movements, and the step of obtaining actual measured values within the critical region is performed during the second relative movements.

5. A method according to claim 4, wherein, during the step of performing the first relative movements, obtaining actual measured values only outside of the critical region.

6. A method according to claim 4, wherein, during the step of performing the first relative movements, obtaining actual measured values within the critical region.

7. A method according to claim 1, further comprising defining a measurement grid of constant mesh density for one or more of the maximum region or for the critical region.

8. A method according to claim 1, further comprising defining a measurement grid of variable density for one or more of the maximum region or for the critical region.

9. A method according to claim 1, wherein the step of defining the critical region includes defining the critical region (a) corresponding to a tooth contact region of the tooth flank, (b) including a tooth contact region of the tooth flank, or (c) using data relating to a tooth contact region of the tooth flank.

10. A method according to claim 9, wherein a position of the tooth contact region on the tooth flank is based upon design data determined in the design of the gearwheel workpiece.

11. A method according to claim 9, wherein
    a position of the tooth contact region on the tooth flank is based upon a data record, and
    the step of defining the critical region includes performing displacement adjustments of the position of the tooth contact region under load of the gearwheel workpiece, and defining the critical region based upon respectively adjusted data.

12. A method according to claim 1, wherein the probe defines a switching probe, and the obtaining steps include bringing the probe into punctiform contact with the tooth flank.

13. A method according to claim 12, further including subjecting the probe to an oscillation.

14. A method according to claim 1, wherein the probe defines a measuring probe and the executing step includes guiding the probe continuously in contact over the tooth flank.

15. A method according to claim 14, further including subjecting the probe to an oscillation.

16. A method according to claim 1, wherein the step of defining the critical region includes defining the critical region (a) corresponding to a region of the tooth flank, (b) including a region of the tooth flank, or (c) using data relating to a region of the tooth flank relevant to excitation behavior during pairing of the gearwheel workpiece with another gearwheel workpiece.

17. A method according to claim 1, wherein the step of defining the critical region includes a preparing step including using a computer to perform a computer-based contact analysis of the gearwheel workpiece, and defining the critical region based upon the contact analysis.

18. A method according to claim 17, wherein the step of defining the maximum region includes defining a polygonal progression as a circumference in a radial projection of the tooth flank.

19. A method according to claim 1, wherein the tooth flank defines a peripheral region or a peripheral distance, and the step of defining the maximum region comprises excluding the respective peripheral region or the peripheral distance from the maximum region.

20. A method according to claim 1, further including defining the first resolution to include a first number of lines and columns and defining the second resolution to include a second number of lines and columns so that the second number defines a grid of higher density than the first number.

21. A method according to claim 1, further including defining the first resolution to include a first grid structure and defining the second resolution to include a second grid structure that defines a higher density than the first grid structure.

22. A method according to claim 1, wherein, prior defining the critical region, performing a first measurement of the gearwheel workpiece in the measuring apparatus or in another measuring apparatus.

23. A method according to claim 1, wherein, prior defining the critical region, performing a computational contact analysis.

24. A measuring apparatus comprising:
at least one probe configured and adapted for contact measurement on at least one tooth flank of a gearwheel workpiece; and
a controller configured to implement the following steps:
 defining a maximum region relating to a tooth flank of a gearwheel workpiece,
 defining a critical region relating to the tooth flank, wherein the critical region at least partly overlaps the maximum region,
 executing relative movements of the probe to guide the probe along the tooth flank and
 obtaining actual measured values of the tooth flank with a first resolution at a plurality of locations within the maximum region, and
 obtaining actual measured values of the tooth flank with a second resolution at a plurality of locations within the critical region, wherein the second resolution is higher than the first resolution.

* * * * *